United States Patent [19]

Nakano et al.

[11] Patent Number: 4,978,989

[45] Date of Patent: Dec. 18, 1990

[54] CAMERA HAVING A RED-EYE FORECASTING AND/OR PREVENTING DEVICE

[75] Inventors: Toshifumi Nakano; Akira Inoue, both of Hachioji; Juro Kikuchi, Yamanashi; Hiroaki Nakamura, Hachioji; Tatsuji Higuchi, Akikawa, all of Japan

[73] Assignee: Olympus Optical Co., Ltd., Japan

[21] Appl. No.: 439,787

[22] Filed: Nov. 21, 1989

[30] Foreign Application Priority Data

Nov. 25, 1988 [JP] Japan ................................ 63-298850

[51] Int. Cl.$^5$ ............................................. G03B 7/00
[52] U.S. Cl. ................................. 354/413; 354/149.11
[58] Field of Search ................................ 354/413–424, 354/149.1, 149.11, 145.1

[56] References Cited

U.S. PATENT DOCUMENTS 4,100,554  7/1978  Iijima ................................. 354/149.1
4,847,647  7/1989  Ueda ................................. 354/149.11

FOREIGN PATENT DOCUMENTS 54-53429  4/1979  Japan .
58-20021  4/1983  Japan .
58-48088  10/1983  Japan .
62-2238   1/1987  Japan .

Primary Examiner—Brian W. Brown
Assistant Examiner—David M. Gray
Attorney, Agent, or Firm—Louis Weinstein

[57] ABSTRACT

A camera having a red-eye alarm device which receives a signal representative of a distance l between an object to be photographed and a camera, the focal length f of a taking lens, a signal representative of a distance d between the optical axis of the taking lens and the center of an electronic flash discharge tube, and develops an alarm signal based upon the object distance l, the focal length f and the spacing d, the red-eye alarm signal being developed when a conditional formula $$\frac{d}{\tan 3°} < l < 70f$$

is satisfied.

43 Claims, 6 Drawing Sheets

CAMERA HAVING A RED-EYE FORECASTING AND/OR PREVENTING DEVICE

BACKGROUND OF THE INVENTION

The present invention relates to a camera having a red-eye forecasting device, and in particular to a camera having a device for forecasting and alarming a photographer of red-eye phenomenon which occurs when taking a picture of a person or persons by using an electronic flash.

It has been well-known for a long time the red-eye phenomenon that people with glowing red eyes are photographed depending upon the distance between an optical axis of a taking lens of a camera and the center of an electronic flash when using the flash.

Various techniques to prevent such red-eye phenomenon have been disclosed in Japanese Laid-open Utility Model Application Sho No. 54-53429, Japanese Laid-open Patent Application Sho/No. 62-2238 and Japanese Patent Publications Sho/No. 58-20021 and Sho/No. 58-48088.

Japanese Laid Open Utility Model Application Sho No. 54-53429 discloses a camera which is adapted to satisfy a given angle $\alpha = \tan^{-1}(d/l)$ in which a red-eye phenomenon is prevented by changing the distance d between an optical axis of a taking lens and the center of an electronic flash depending upon the distance l between an object to be photographed and the camera as shown in FIG. 8.

Japanese Patent Publication Sho No. 58-48088 discloses a camera in which a regular electronic flash photographing operation is conducted so that glowing red-eyes are not prominent after conducting preliminary flashing to reduce a pupil diameter at a dark place. This is based on the fact that the red-eye phenomenon occurs when photographing is conducted by using a flash in a dark place while a person has widely open pupils.

Japanese Laid-open Patent Application Sho No. 62-2238 discloses a camera having two short and long focal length taking lenses in which an electronic flash is adapted to be moved away from the taking lens when photographing is conducted by using the long focal length lens in which a magnified red-eye readily occurs.

Japanese Patent Publication Sho No. 58-2002 suggests that factors of red-eye phenomenon include four factors as follows:

(1) brightness level at the photographing site (Bv);
(2) light emission amount (GNo) of a built-in electronic flash;
(3) the distance d between the optical axis of a taking lens of a camera and the center of a light emitting tube of a built-in electronic flash; and
(4) the distance (l) between the eyes of a person to be photographed and a camera. Japanese Patent Publication Sho/No. 58-20021 also mentions a formula showing the relation between GNo and d which is a condition of red-eye phenomenon.

Although Japanese Laid Open Utility Model Application Sho No. 54-53429 discloses a camera in which a light emission portion is moved in relation to an object distance l, it does not mention the condition of redeye phenomenon. It is troublesome for photographers to move a light emission portion even in a light environment where red-eye phenomenon does not occur.

This is the same as Japanese Laid-open Patent Application Sho No. 62-2238. There is no description of the condition of red-eye phenomenon. It is irrational and inconvenient to move an electronic flash every time when photographing is conducted.

Japanese Patent Publication Sho No. 58-48088 has never determined the condition of red-eye phenomenon and aims at preventing the red-eye phenomenon by photographing with a pupil contracted due to preliminary light emission. A photographer has to wait about 1.6 seconds from the preliminary light emission to the contraction of a pupil. Therefore a shutter chance may be lost. The photographer does not know when preliminary light emission should be conducted since the condition of red-eye phenomenon is not determined.

The Japanese Patent Publication Sho No. 58-20021 mentions the relation between the GNo and a distance d between a taking lens and an electronic flash and suggests a range of the relation where red-eye phenomenon occurs. But it is not too much to say that GNo is not related with red-eye phenomenon since red-eye phenomenon takes place on a film. Red glowing eyes having a suitable brightness are photographed on a film independently of GNo as far as photographing is conducted on proper exposure. This prior art determines GNo and a distance d assuming the focal length of a taking lens be about 38 mm. It is not meaningful to determine the conditions of red-eye phenomenon based upon only these GNo and d since compact cameras having two focal points and compact cameras having a zoom lens are presently in widespread use, resulting in a significant increase in the frequency of high magnification photographing.

SUMMARY OF THE INVENTION

It is an object of the present invention to overcome the drawbacks of the prior art by providing for a camera means having a red-eye forecasting capability which provides a red-eye occurrence alarm when the photographing conditions suggest a high probability of red-eye occurrence.

It is another object of the present invention to provide a camera in which red-eye phenomenon is prevented by changing the distance between an electronic flash and a taking lens or the focal length of the taking lens if red-eye phenomenon is possible.

DETAILED DESCRIPTION OF THE PREFERRED EMBODIMENTS

A mechanism of red glowing eye phenomenon will be described prior to the description of an example of the present invention.

Figure 5:
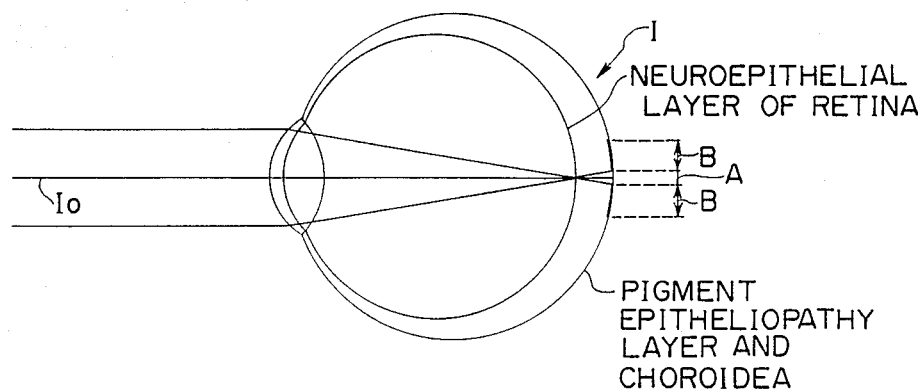
FIGS. 5 and 6 are schematic sectional views showing an eye ball for explanation of the mechanism of red-eye phenomenon.

Referring now to FIG. 5, there are shown paths of light incident upon an eye ball when the eye is gazing upon the electronic flash. The optical path $I_o$ of the eye ball is aligned with a linear line connecting the eye ball I and the electronic flash In FIGS. 5 and 6, the spacing between the neuroepithelial layer of retina and the pigment epitheliopathy, and choroidea are exaggerated for convenience of the illustration.

Assuming the electronic flash to be small for simplicity of the description, the electronic flash is imaged on the surface of the neuroepithelial layer of retina as a spot. However, since there is a finite spacing between the neuroepithelial and the pigment epitheliopathy, choroidea a defocussed image of the electronic flash (hereinafter referred to as "portion A") is formed behind the neuroepithelial layer of the retina. Since the portion is very bright, absorption of light by the pigment epitheliopathy layer can not follow the progress of light and the light may spread into the pigment epitheliopathy layer and choroidea. The portion into which light spreads is B (hereinafter referred to as "Portion B"). If the pupil is widely opened at this time, the portion A is then large and the illumination is high, resulting in a large portion B and higher brightness.

Figure 6:
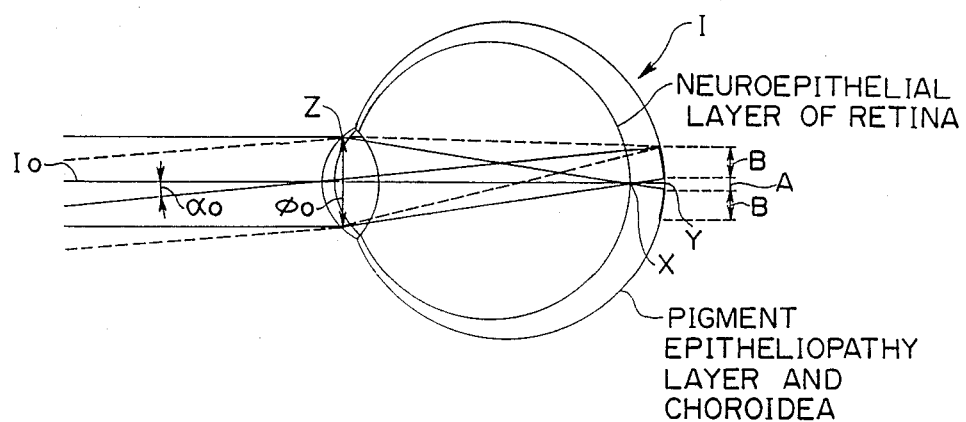

Referring now to FIG. 6, there are shown paths of the light incident upon and emerged from an eye ball which is focussed upon an electronic flash. Solid lines depict light from the portion A and dotted lines depict light from the portion B. A study of the angles between the respective light rays and the optical axis $I_o$ of the eye ball shows that the angle between the light from the portion A and the optical axis $I_o$ is larger than the angle between the light from the portion B and the optical axis $I_o$.

A study of the relation between the respective size of the portions A and B and the angles between the light rays from the portions A and B and the optical axis $I_o$ of the eye ball shows that the larger the size of the portions A and B, the larger the angles between respective light rays from the portions A and B and the optical axis $I_o$ of the eye ball. This means that the more widely the pupil opens, the larger the angle defining an area where light rays from the portions A and B can be observed. Taking into consideration the fact that the more the pupil opens, the brighter the portion A or B becomes, it can be understood that red-eye phenomenon readily occurs in a dark area.

Both the portions A and B are seen as red since the color of the pigment epitheliopathy layer and the choroidea is red. When the exposure of a face of an object to be photographed is proper, the color of the eye-grounds is photographed faint and creamy white. The light from the portion A is excessively bright, and the light from the portion B is proper exposure or tends to be low exposure. Therefore the color of the eyes is photographed red, the color of the eye grounds.

As is common to the portions A and B, a study of the relation of an angle between the light ray from some point in the portions A and B and the optical axis $I_o$ of the eye ball shows that the angle between the respective light ray and the optical axis $I_o$ of the eye ball depends on the part of the eye ball through which the light passes. This means that the illumination distribution over a given range on the eye grounds can be seen in the pupil. However in an actual photographic picture, it is difficult to determine an interface between the portion B and the outer dark portion although an interface between the portions A and B can be found.

Research on the angle at which red eye phenomenon occurs in the dark has actually been conducted with respect to young people and it shows that it is a range not higher than one degree at which the light rays from the portion A can be photographed. It is a range not higher than 3 to 2 degrees at which the light from the portion B can be photographed. Assuming the red eye occuring model as shown in FIGS. 5 and 6, the spacing between the neuroepithelial layer of retina and the portion A is about 0.4 mm and the width of the portion B is about 0.5 mm. A reference "Physiology on Eyes" edited by Akira Hagiwara says that the spacing between the neuroepithelial layer of retina and the portion A, that is, the thickness of the retina, is 0.2 to 0.4 mm and substantially meets the above result.

Figure 8:
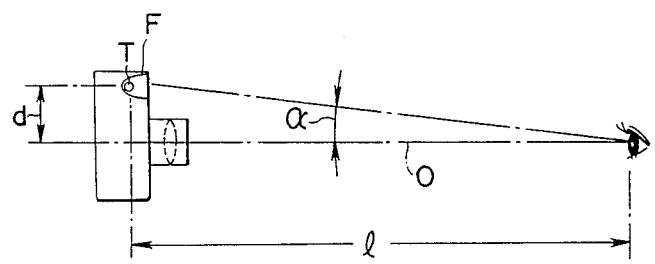
FIG. 8 is a view showing a prior art technique.

Factors which are considered as factors of red-eye phenomenon include the brightness $B_v$ of an environment where photographing is conducted; the pupil diameter $\phi_0$ which changes depending upon the brightness; a distance d between an optical axis 0 of a taking lens of a camera (refer to FIG. 8) and the center of a light emitting discharge tube T of an built-in electronic flash F;

a distance (l) between an eye of a person to be photographed and a camera:

an angle $\alpha$ determined by the distances d and l, a red-eye occurring critical angle $\alpha_0$ determined by the pupil diameter $\phi_0$; and a photographing magnification $\beta$ determined by a focal length f of the taking lens and the photographing distance l.

The relation between the above-mentioned factors and red-eye phenomenon will be then described.

The present inventors have found that the above angle $\alpha$ and the pupil diameter $\theta_0$ determines whether or not the red-eye phenomenon occurs. In other words, assuming optical paths in an eye model I as shown in FIG. 6, the red-eye occurring critical angle $\alpha_0$ is determined by the size of a pupil diameter $\phi_0$.

Red-eye phenomenon occurs when $$\alpha < \alpha_0 \qquad (1).$$

Figure 7:
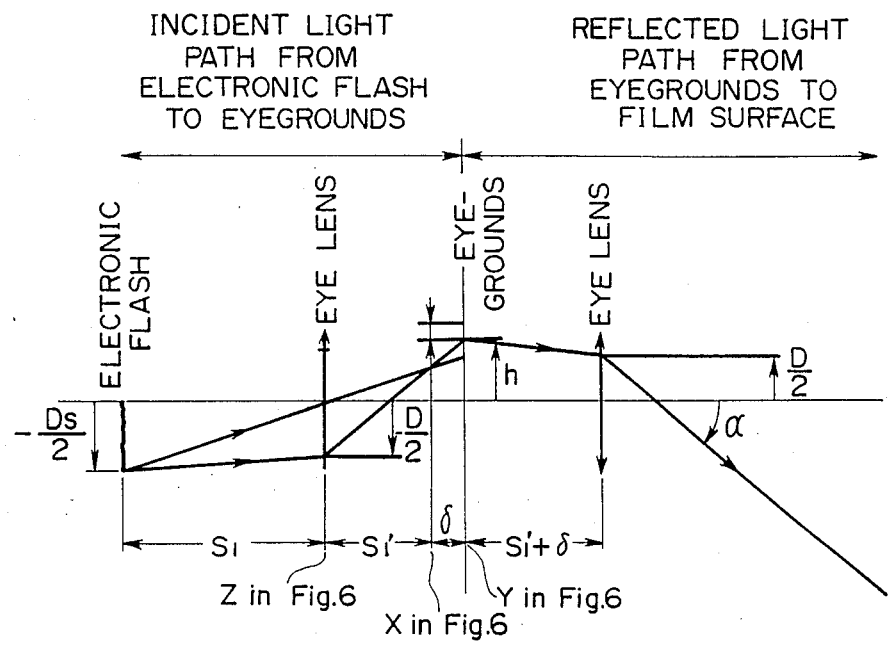
FIG. 7 is a view showing an incident flash light path from an electronic flash to eyegrounds and a reflection light path from the eyegrounds to a film surface.

A photographing distance l between an eye of a person to be photographed and a camera, a distance d between the optical axis O (FIG. 8) of a taking lens of a camera and the center of an light emitting flash discharge tube of a built-in electronic flash and an angle $\alpha$ shown in FIG. 7 have the following relation;

$$l = d/\tan|\alpha| \qquad (2)$$

A red-eye occurring critical photographing distance $l_0$ is represented by $$l_0 = d/\tan|\alpha_0| \qquad (3)$$

From $\alpha < \alpha_0$ in formula (1) and the formulae (2) and (3), we have $l > l_0$ \qquad (4)

That is, $l > d/\tan|\alpha_0|$ \qquad (5)

Red-eye phenomenon occurs when the formula (5) is established. On the other hand, it is generally known that the pupil diameter $\phi_0$ depends upon a brightness Bv of an outer environment. It is represented by the following formula;

$$\phi_0 = f(Bv) \qquad (6)$$

Figure 9:
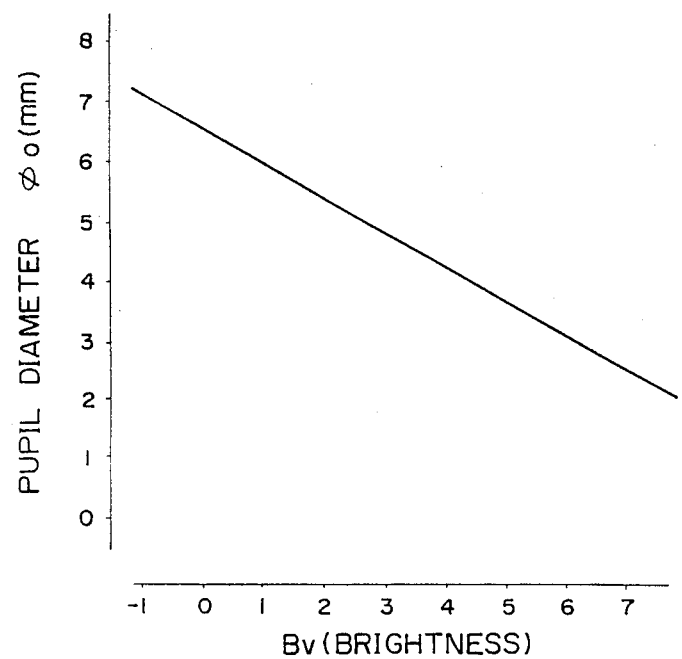
FIG. 9 is a view showing the relation between brightness and the pupil diameter.

Actual measurement of the brightness and the pupil diameter shows that $\phi_0$ is substantially proportional to Bv as shown in FIG. 9. The pupil diameter $\phi_0$ in darkness is about 7 mm although it differs depending upon the race of the person being photographed. It has been found that the pupil diameter at a brightness $BV = -1$ has already been equal to that in the darkness as shown in FIG. 9. Considering general photographing using an electronic flash is frequently conducted at less than (ISO 100)Bv=2, $\phi_0 = 5.5$, a red-eye occurring critical angle $\alpha_0$ is optically calculated assuring $\phi_0 = 5.5$ mm with reference to FIG. 6. We have $|\alpha_0| \approx 2°$ by a formula as described herebelow.

A red-eye critical angle $\alpha_0$ taking into consideration normal and short sight may be calculated by using the following determinants established from the various parameters in FIG. 7.

$$\begin{pmatrix} \\ h \end{pmatrix} = \begin{pmatrix} 1 & 0 \\ -(S_1' + \delta) & 1 \end{pmatrix} \begin{pmatrix} 1 & 4 \\ 0 & 1 \end{pmatrix} \begin{pmatrix} 1 & 0 \\ S_1 & 1 \end{pmatrix} \begin{pmatrix} -D + D_s \\ \frac{2S_1}{-D_s/2} \end{pmatrix}$$

$$\begin{pmatrix} \tan\alpha \\ \end{pmatrix} \begin{pmatrix} 1 & 4 \\ 0 & 1 \end{pmatrix} \begin{pmatrix} 1 & 0 \\ -(S_1' + \delta) & 1 \end{pmatrix} \begin{pmatrix} \frac{-D/2 + h + \epsilon}{S_1' + \delta} \\ h + \epsilon \end{pmatrix}$$

$D$: the pupil diameter ($\phi_0$ in FIGS. 5 and 6)

$S_1$: the distance between an eye and an electronic flash ($<0$)

$D_s$: the width of an electronic flash $S_1'$: the distance between an eye and an imaging position ($>0$)

$\delta$: the distance between the imaging position and eye grounds $f, \phi$: the focal length and the power of an eye $\epsilon$: the light spread length at the eye grounds
(dimension $B$ in FIGS. 5 and 6)

$h$: a maximum height of light directly reached at the eye grounds
(dimension $A$ in FIGS. 5 and 6)

$\alpha$: an absolute maximum angle of the light scattered at the eye grounds.

: this reference mark means that this term is to be neglected in calculation of the above determinants.

We have also $|\alpha_0| = 3°$ when assuming $\phi_0 = 7$ mm and calculating $\alpha_0$ as is done similarly to the above case.

That is, maximum $\alpha_0$ is generally calculated as about 3°. It is understood that $\alpha_0$ may be reduced to about 2° if considering the brightness of a scene where flash photographing may be possibly conducted.

Condition of red-eye phenomenon is determined by the formula (5) $l > d/\tan|\alpha_0|$. Even if a distance $l$ is in the range of the above-formula where the red-eye phenomenon occurs, the red-eye on a print is differently viewed depending upon a photographing magnification. Assuming the dimension of a red-eye photographed on a standard 35 mm film be $\phi_F$, it may be represented as a product of a pupil diameter $\phi_0$ with a magnification $\beta$. A magnification is represented as follows:

$$\beta \approx f/l \qquad (7)$$

wherein f denotes a focal length of a taking lens.

$$\phi_F = \phi_0 \beta = \phi_0 \times f/l \qquad (8)$$

Accordingly, a photographing distance $l$ is represented as follows:

$$l = (\phi_0 \times f)/\phi_F \qquad (9)$$

The dimension of a red-eye photographed on a film is $\phi_F$. If the $\phi_F$ is enlarged to a popular print size, the diameter $\phi_{F0}$ of the printed red-eye is represented as follows:

$$\phi_{F0} = 3.3 \times \phi_F$$

in case of popular size.

Photographings were conducted at various magnifications to determine the presence of red-eye phenomenon. This test shows that $\phi_{F0}$ having a size not less than 0.3 mm is not generally recognized as red-eye. $\phi_F$ is determined upon basis of this result.

$$\phi_F = \phi_{F0}/3.3 = 0.3/3.3 \approx 0.1 \text{ mm}$$

That is, if the dimension $\phi_F$ of a red-eye photographed on the film surface is made 0.1 mm, red-eye will not occur on an enlarged popular size print. Accordingly, it is appropriate to deem that red-eye phenomenon occurs, if $$\phi_F > 0.1 \qquad (10)$$

From formulae (9) and (10) a photographing distance $l$ is represented as follows :

$$l < (\phi_0 \times f)/0.1 \qquad (11)$$

When the above formula is satisfied, red-eye phenomenon occurs. If a maximum $\phi F$ of the red-eye photographed on a film, which can not be recognized is assumed as $\phi F'$, the above formula (11) is modified as follows:

$$l < (\phi_F \times f)/\phi_{F'} \qquad (12)$$

At this condition, a red-eye occurs and is recognized. Occurrence of red-eye phenomenon is determined only by the above-formula (5). Taking into consideration the fact that a red-eye having not greater than a given value $\phi_{F'}$ photographed on a film is inconspicuous, red-eye occurrence may be indicated by a suitable alarm condition or signal if both the formulae (5) and (12) are satisfied. Red-eye phenomenon can be prevented from occurring according to needs by popping-up an electronic flash to increase the distance d in response to this alarm or moving or changing a taking lens or lenses of a zoom lens camera or focal point changing camera to a short focal point to decrease the photographing magnification in response to the alarm.

In the present invention, enlargement to a is possible for a photographer to mitigate or make strict the red-eye occurrence condition if a camera is adapted to change the conditions such as pupil diameter $\phi_0$ and a given dimension $\phi_F'$ of a red-eye photographed on a film surface as desired if necessary.

Although the present invention will be described with reference to a camera having a built-in electronic flash, it is understood, of course, that the present invention is applicable to other cameras having a detachable electronic flash in which the distance d between the optical axis of a taking lens and the center of an electronic flash discharge tube can be preliminarily preset and altered, whenever necessary.

Embodiments of the present invention will be described with reference to the drawing.

Figure 1:
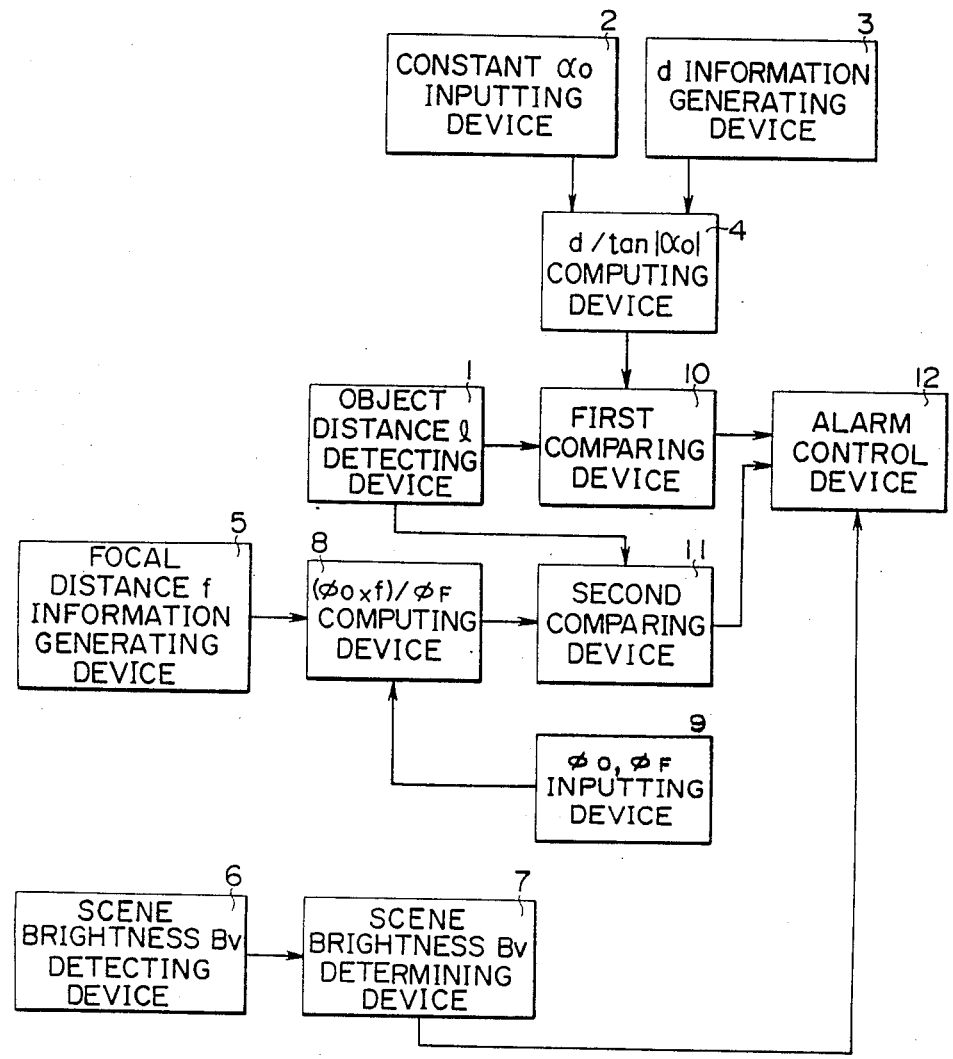
FIG. 1 is a block diagram showing an example of a red-eye forecasting device used in a camera of the present invention.

Referring now to FIG. 1, there is shown a red-eye forecasting device in a camera, which is one example of the present invention. If desired, the forecasting device may be in a separate enclosure physically mounted to the camera housing or may be separated from the camera and coupled by an electrical cable.

The red-eye forecasting device comprises first and second comparing devices 10 and 11 into which is applied an output from a device 1 for detecting the distance between an object to be photographed and the camera; a device 4 for computing $d/\tan|\alpha_0|$ to input the calculated value to the first comparing device 10; an input device 2 for inputting a constant $\alpha_0$ to the computing device 2 and d information generating device 3 for inputting information (d) into the computing device 4; a device 8 for computing and $(\phi_0 \times f)/\phi_F$ and inputting same to the second comparing device 11; a focal length information generating device 5 for inputting focal length information (f) into the computing device 8; a device 9 for inputting predetermined constants $0_0$, $\phi_F$ into said computing device 8; a device 6 for detecting brightness of a scene to be photographed and an alarm control device 12 to which outputs from the first and second comparing devices 10 and 11 and the scene brightness or external brightness determining device 7 are inputted.

In the thus formed red-eye forecasting device, the computing device 4 computes $d/\tan|\alpha_0|$ from information d inputted from the d information generating device 3 for generating a distance d between the center of the taking lens and the center of a discharge tube of an electronic flash and a constant $\alpha_0$ preliminarily inputted from the input device 2. The computing device outputs the computed value for $d/\tan p|\alpha_0|$ to the first comparing device 10, which compares the computed value with a value of the object distance l inputted from the object distance detecting device 1 to provide an output to the alarm control device 12.

On the other hand, the computing device 8 computes $(\phi_0 \times f)/\phi_F$ from information on a focal length generated by the focal length generating device 5 and constants $\phi_0$ and $\phi_F$ inputted from the input device 9 and outputs the computed value to the second comparing device 11. The second comparing device 11 compares the inputted value with a value of distance l detected by the detector device 1 to provide an output to the alarm control device 12. The alarm control device 12 outputs red-eye occurring alarm information when the values which are compared in both comparing devices 11 and 12 satisfy $1>d/\tan|\alpha_0|$ and $l<(\phi_0 \times f)/\phi_F$ and the Bv value inputted from the determining device 7 satisfies $Bv<2$.

Therefore, red-eye phenomenon is prevented by popping up the electronic flash to increase a distance d between the center of a light emitting discharge tube of an electronic flash or by changing the focal length from a long value to a short value in a bifocal point camera or in a camera having a zoom lens to decrease the photographing magnification only when the above-mentioned alarm information is provided.

Figure 2:
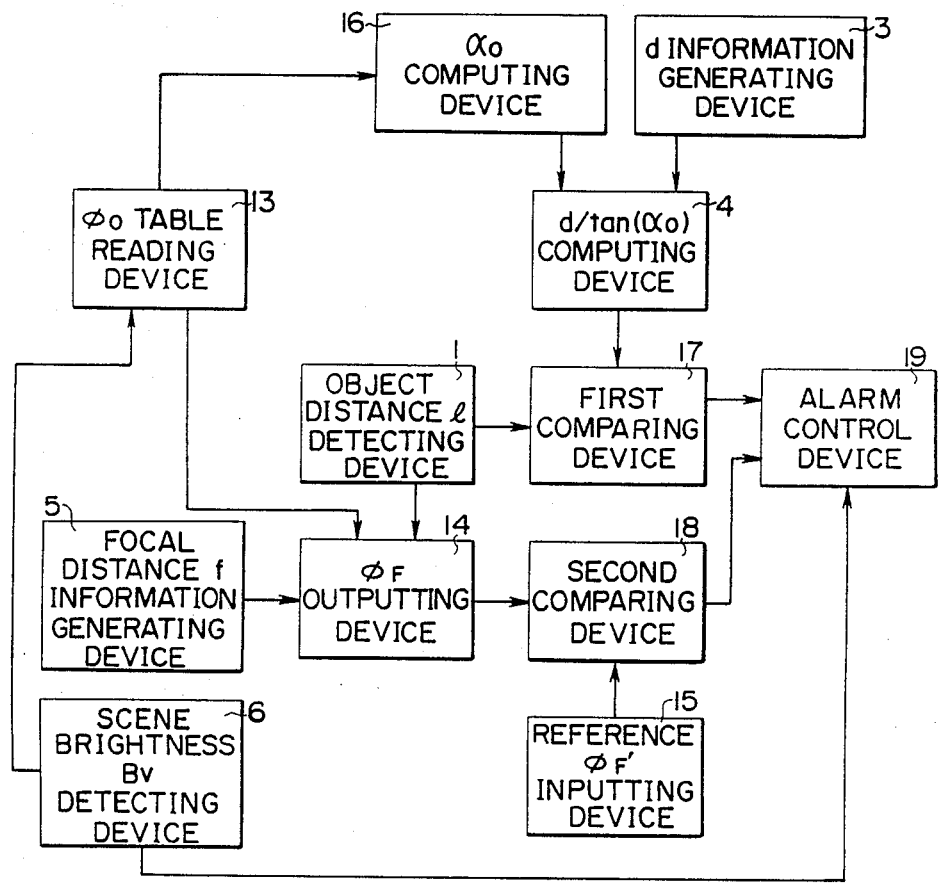
FIG. 2 is a block diagram showing another example of a red-eye forecasting device used in a camera of the present invention.

Referring now to FIG. 2, there is shown a red-eye forecasting device of a camera, which is a second embodiment of the present invention.

The red-eye forecasting apparatus comprises a first comparing device 17 into which an output from a device 1 for detecting an object distance (l) is inputted, a $\phi_F$ output device 14 which receives respective outputs from the distance (l) detecting device 1, focal length (f) information generating device 5 and a $\phi_0$ table reading device 13 and provides an output to a second comparing device 18; the $\phi_0$ table reading device 13 which receives a value of brightness from a device 6 for detecting the brightness (Bv) of a scene to be photographed to provide an output to the computing device 16 and the $\phi_F$ output device 14; a device for computing $d/\tan|\alpha_0|$ which receives data from the $\alpha_0$ computing device 16 and an information d providing device 3 to provide a computed value to the first comparing device 17; a reference $\phi_F'$ input device 15 for inputting a value $\phi_F'$ to the second comparing device 18; and an alarm control device 19 into which respective outputs from the first and second comparing devices 17 and 18 are inputted.

In the thus-formed red-eye forecasting apparatus, the $\phi_0$ table reading device 13 reads a current pupil diameter $\phi_0$ from a preliminarily set table based upon the scene brightness Bv detected by the scene brightness (Bv) detecting device 6 and a red-eye critical angle $\alpha_0$ is then computed in the computing device 16. The computing device 4 computes $d/\tan|\alpha_0|$ based upon the computed critical angle and the distance d between the center of a taking lens and the center of a light emitting discharge tube of an electronic flash to provide a calculated value to the first comparing device 17 in which the inputted calculated value $d/\tan|\alpha_0|$ is compared with an object distance (l) detected by the distance (l) detecting device 1 to determine whether the condition $l>d/\tan|\alpha_0|$ is established.

On the other hand, the $\phi_F$ output device i4 determines the dimension $\phi_F$ of a red-eye photographed upon a film by using the formula (8) from $\phi_0$ read by the $\phi_0$ table reading device 13, a focal length information f generated in the focal length information generating device 5, and an object distance l detected by the device for detecting the object distance and then provides it to the second comparing device 18. The second comparing device 18 compares $\phi_F'$ which has been preliminarily inputted from the reference $\phi_F'$ input device 15 with $\phi_F$ to determine if the relationship $\phi_F' < \phi_F$ is established. The alarm control device 19 outputs red-eye alarm information only when $l>d/\tan|\alpha_0|$ is satisfied in the first comparing device 17, $\phi_F' < \phi_F$ is satisfied in the second comparing device 18 and when $Bv<2$.

Accordingly, countermeasures are taken to prevent the red-eye phenomenon as mentioned above if the red-eye alarm is outputted.

Figure 3:
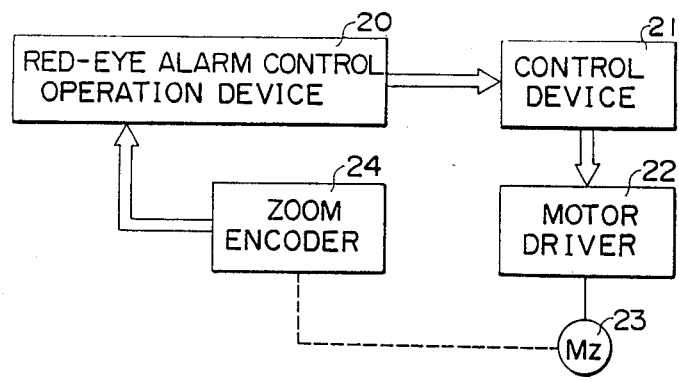
FIG. 3 is a block diagram showing an example of means for preventing red-eye phenomenon from occurring.

Referring to FIG. 3, there is shown an example of a device for preventing a red-eye phenomenon by using red-eye alarm information outputted from the aforementioned red-eye forecasting device. This red-eye phenomenon preventing device is applicable to a camera having a zoom lens and is adapted to prevent red-eye phenomenon by reducing a photographing magnification of the camera. The red-eye alarm control operation device 20 comprises a red-eye detection means of the type shown in either FIG. 1 or 2. Focal length information from zoom encoder 24 which has read the focal distance information changed by zooming is inputted to the device 20. Red-eye alarm information from the red-eye alarm control operation device 20 is inputted to a control device 21 for controlling a zoom motor 23. The control device 21 is adapted to control the zoom motor 23 via a motor driver 22.

In the thus-formed red-eye phenomenon preventing device, the focal length information read by the zoom encoder 24 is provided to the operation device 20 which determines whether or not the red-eye phenomenon will occur. The operation device 20 provides red-eye alarm information to the control device 21 when it determines that a red-eye phenomenon will occur. The control device 21 generates a signal for driving the zoom motor 23 in response to the red-eye alarm information for driving the zoom motor 23. The focal length information which changes by the zooming operation is constantly read by the zoom encoder. The information is also fed to the red-eye alarm, control and operation device 20. When the red-eye occurring condition is eliminated, supply of a signal from the device 20 to the control device 21 is terminated to disable the motor driver 22 so that zooming by the zoom motor 23 is also terminated.

Although the aforementioned red-eye preventing device is adapted to prevent the red-eye phenomenon from occurring, this device is applicable to a multi-focal point changing camera if the zoom motor 23 and the zoom encoder 24 are replaced with a focal point changing motor and a state switch which is actuated on focal point changing respectively.

Figure 4A:
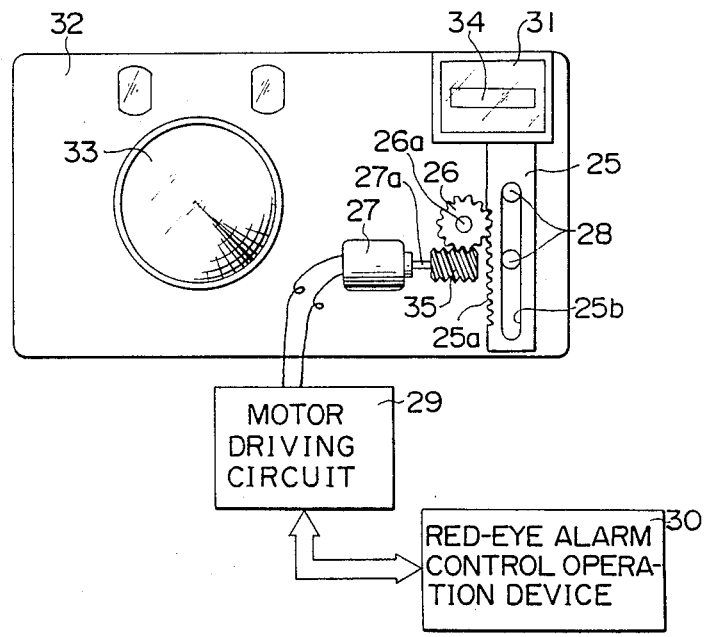
FIGS. 4 A and 4 B are block diagrams showing another example of means for preventing red-eye phenomenon from occurring.
Figure 4B:
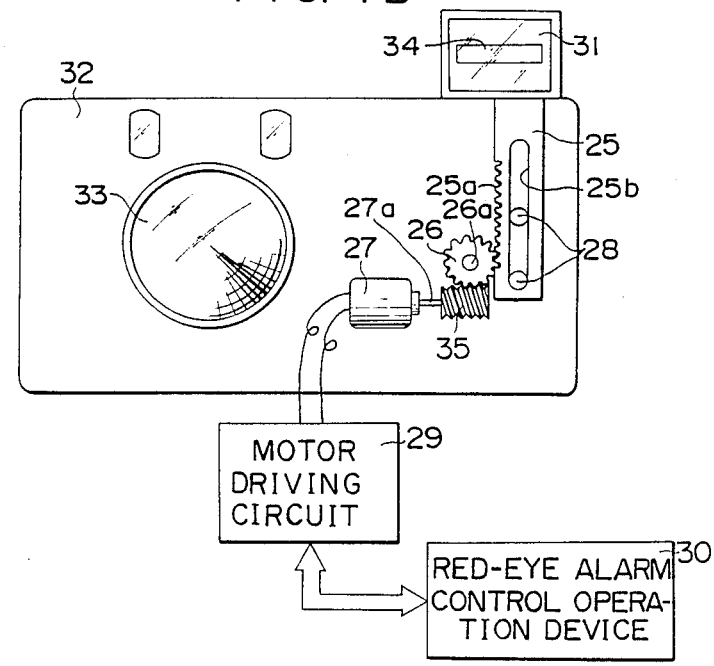

FIGS. 4(A) and 4(B) show another example of red-eye phenomenon preventing means. The present invention is incorporated in a camera in which an electronic flash can be popped-up with respect to a camera body 32 to increase the distance between the center of taking lens 33 and the center of a light emitting discharge tube 34 in electronic flash 31.

The electronic flash 31 is supported on the upper end of an electronic flash supporting member 25 which is comprised of an elongated rectangular plate. The supporting member 25 is provided with an electronic flash ascending and descending rack 25a along one side thereof. The flash supporting member 25 is formed with an elongated guiding slot 25b at the center thereof which extends in a vertical direction. Guide pins 28 secured to a stationary member (not shown) in the camera body 32 extend into and slidably engage the slot 25b in such a manner that the supporting member 25 may be moved only in a vertical direction. A driving gear 26 comprising a worm gear rotatably journalled on a journal shaft 26a secured on the camera body 32 is meshed with the rack 25a. The gear 26 is further meshed with a power transmission gear 35 comprising a worm gear secured to an output shaft 27a of an electronic flash ascending/descending motor 27. The rotation of the motor 27 is controlled by a motor driving circuit 29. Red-eye alarm information is inputted to the driving circuit 29 from a red-eye alarm, control and operation device 30. The operation device 30 comprises a red-eye forecasting device of the type shown in FIG. 1 or 2.

In the thus-formed camera, the electronic flash 31 assumes a lowered position as shown in FIG. 4(A) when normal photographing is conducted and the flash 31 assumes a popped-up or elevated position as shown in FIG. 4(B) when a red-eye condition is alarmed. When the red-eye alarm information is generated from the red-eye alarm, control and operation device 30, the driving circuit 29 drives the ascending/descending motor 27 since the alarm information is inputted into motor driving circuit 29. The driving gear 26 is then rotated via the power transmission gear 35, the flash supporting member 25 is moved in an upward direction to displace the electronic flash to an upper position. This action increases the distance between the center of the taking lens 33 and the center of the light emitting discharge tube 34 to prevent occurrence of the red-eye phenomenon.

The popped-up electronic flash 31 is automatically halted or lowered by the turning off a main switch of a camera or when the camera is rendered out of the range of red-eye occurring conditions.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. For use with a camera having a taking lens and an electronic flash spaced a distance d from said taking lens, apparatus for detecting a potential red-eye phenomenon comprising;

first means for providing a signal representative of said distance d, second means for providing a signal representative of the object distance l between a subject to be photographed and the camera;

third means responsive to said first and second means for determining whether the relation between the object distance l and the spacing distance d satisfies the formula $$l > \frac{d}{\tan 3°} ; \text{ and}$$

signal means for providing a red-eye alarm signal when the aforesaid relation between object distance and spacing distance d is satisfied.

2. The apparatus of claim 1 wherein said electronic flash includes an electronic flash discharge tube and said distance d is measured between the optical axis of the taking lens and the center of said electronic flash discharge tube.

3. The apparatus of claim 1 wherein said camera includes a camera housing and said apparatus is arranged within said camera housing.

4. For use with a camera having a taking lens and an electronic flash spaced a distance d away from said taking lens, apparatus for detecting a potential red-eye phenomenon comprising:

first means for providing a signal representative of said distance d;

second means for providing a signal representative of the focal length f of the taking lens;

third means for providing a signal representative of the object distance l between a subject to be photographed and the camera;

fourth means for determining whether the relation between the object distance l and the spacing distance d satisfies the formula $$\frac{d}{\tan 3°} < l < 70f; \text{ and}$$

means for providing a red-eye alarm signal when the aforesaid relation between object distance l and spacing distance d and the relation between object distance l and focal length f are satisfied.

5. For use with a camera having a taking lens and an electronic flash spaced a distance d from said taking lens, apparatus for detecting a potential red-eye phenomenon comprising:

first means for providing a signal representative of said distance d;

second means for providing a signal representative of the focal length f of the taking lens;

third means for providing a signal representative of the object distance l between a subject to be photographed and the camera;

fourth means responsive to the signals from said first, second and third means for determining whether the relation between the object distance l and the spacing distance d and the relation between the object distance l and the focal length f satisfy the formula $$\frac{d}{\tan \alpha_o} < l < 70f, \text{ where}$$

$$2° \leq \alpha_o \leq 3°; \text{ and}$$

means for providing a red-eye alarm signal when the aforesaid relation between object distance l and spacing distance d and the relation between the object distance l and the focal length f are satisfied.

6. The apparatus of claim 5 wherein said electronic flash includes an electronic flash tube and said distance d is measured between the optical axis of the taking lens and the center of said electronic flash tube.

7. The apparatus of claim 5 wherein said camera includes a camera housing; and said apparatus being arranged within said camera housing.

8. The apparatus of claim 5 wherein said taking lens includes means for changing the focal length thereof; and control means for changing the focal length f of said taking lens to a focal length value which no longer satisfies the condition of the aforementioned formula responsive to said red-eye alarm signal.

9. The apparatus of claim 5 further comprising control means for moving said electronic flash to increase the distance d to a value which no longer satisfies the conditions of the aforementioned formula responsive to said red-eye alarm signal.

10. The apparatus of claim 9 wherein said camera includes a camera housing, said electronic flash being movably mounted upon said camera housing.

11. The apparatus of claim 10 wherein said means for moving said electronic flash further includes motor means being activated responsive to said red-eye alarm signal;

means movably mounting said electronic flash upon said camera housing; and means responsive to activation of said motor means for moving said movable mounting means.

12. In combination, a camera having automatic focal point detection means, a zoom lens and an electronic flash spaced a predetermined distance d away from said zoom lens and apparatus for detecting the occurrence of red-eye phenomenon comprising:

means for determining a distance l between a subject to be photographed and the camera, means for determining a critical distance $l_0$, said critical distance being a distance at which the red-eye phenomenon occurs, said critical distance determining means including computing means receiving signals representing said distance d and an angle value $\alpha_0$ which represents the critical angle at which a red-eye phenomenon occurs, said critical angle being represented by the angle computed from a pupil diameter determined by the brightness of the scene or an external field;

comparing means for determining when the value l is greater than $l_o$ which is computed from the values d and $\alpha_0$ ($l > l_0$); and means responsive to said comparing means for providing an alarm signal when l is greater than $l_0$.

13. In combination, a camera having automatic focal point detection means, a zoom lens and an electronic flash spaced a predetermined distance d from said zoom lens and apparatus for detecting the occurrence of red-eye phenomenon comprising:

means for determining a distance between a subject to be photographed and the camera, means for determining a critical distance $l_0$, said critical distance being a distance at which the red-eye phenomenon occurs, said critical distance determining means including computing means receiving signals representing said distance d and an angle value $l_0$ which represents the critical angle at which a red-eye phenomenon occurs, being three degrees (3°).

14. In combination, a camera having automatic focal point detection means, a zoom lens and an electronic flash spaced a predetermined distance d from said zoom lens and apparatus for detecting the occurrence of red-eye phenomenon comprising:

means for determining a distance l between a subject to be photographed and the camera, means for determining a critical distance $l_0$, said critical distance being a distance at which the red-eye phenomenon occurs, said critical distance determining means including computing means receiving signals representing said distance d and an angle value $\alpha_0$ which represents the critical angle at which a red-eye phenomenon occurs, said critical angle being two degrees (2°).

15. In combination, a camera having automatic focal point detection means, a zoom lens and an electronic flash spaced a predetermined distance d from said zoom lens and apparatus for detecting the occurrence of red-eye phenomenon comprising:

means for determining a distance l between a subject to be photographed and the camera, means for determining a critical distance $l_0$, said critical distance being a distance at which the red-eye phenomenon occurs, said critical distance determining means including computing means receiving signals representing said distance d and and angle value $\alpha_0$ which represents the critical angle at which a red-eye phenomenon occurs, said critical angle lying in the range from two to three degrees (2°–3°).

16. The combination of claim 12 where in said critical distance $l_0$ is determined based upon the relationship $l_0 = d/\tan|\alpha_0|$.

17. The combination of claim 12 further comprising means for providing scene brightness information;
means for preventing the red-eye alarm signal generating means from outputting a red-eye alarm signal when the brightness of the scene to be photographed as represented by the scene brightness information is lower than a predetermined value.

18. In combination a camera having automatic focal point detecting means, a zoom lens and an electronic flash, and apparatus for detecting the occurrence of red-eye phenomenon comprising:
means for providing a signal representative of a critical angle $\alpha_0$ which is computed from a pupil diameter determined by the brightness of an external field;
means for providing a signal representing a distance d between the taking lens and the electronic flash;
said automatic focal point detecting means detecting the object distance l between the object and the camera;
means for computing a critical distance $l_0$ utilizing the values $l_0$ and d wherein the critical distance represents the distance at which there is a possibility of occurrence of the red-eye phenomenon;
means for comparing the object distance l from said automatic focal point detecting means and the critical distance $l_0$ for providing an output when $l > l_0$;
second means for computing a critical object distance $l_0$, based on the value $\phi_0$ representative of the dimension of the pupil of the subject to be photographed, the focal length f of the taking lens and a minimum dimension $\phi_F$, which represents the size of the image of the pupil of an object which is formed on a film which does not cause a red-eye condition;
means for comparing the object distance value l and said critical distance $l_0$, for generating a potential red-eye condition when $l < l_0$; and
means for providing a red-eye phenomenon alarm signal when said first and second comparing means indicate that the conditions $l > l_0$ and $l < l_0'$ are satisfied.

19. The combination of claim 18 wherein said minimum dimension $\phi_F'$ representing the light reflected from an eye of the subject which is not recognized as a red-eye condition is 0.1 mm.

20. The combination of claim 18 in which the computing means for determining $l_0'$ calculates the value $l_0'$ according to the formula:

21. The combination of claim 18 further comprising means for determining the brightness of the scene to be photographed; and
means for preventing said means for providing an alarm signal from generating an alarm signal when the brightness value detected is greater than a predetermined value.

22. A red-eye phenomenon detector for use with a camera having a taking lens and flash means having a center located a distance d from the optical axis of said taking lens, said detector comprising:
means for producing a signal representing the distance d;
means responsive to a scene brightness value for determining a pupil diameter value;
means responsive to said pupil diameter value for providing a signal representing a critical angle $\alpha_0$, which is computed from a pupil diameter determined by the brightness of an external field;
means responsive to the distance signal d and said critical angle signal for determining a critical distance $l_0$ at which the red-eye phenomenon occurs;
means for determining the distance l between the person being photographed and the camera;
means responsive to the distance l and the critical distance $l_0$ for providing an alarm condition when $l > l_0$.

23. A red-eye phenomenon detecting device for use with a camera having a taking lens and flash means whose center lies a distance d from the optical axis of the taking lens, said detecting device comprising:
means for generating a signal representative of the brightness Bv of the scene being photographed;
means for providing a signal representative of the focal length f of the taking lens;
means responsive to said brightness signal Bv for providing a pupil diameter signal $\phi_0$ representing the diameter of the pupil of a subject to be photographed;
means for providing a signal $\phi_F'$ representative of the light of the electronic flash reflected by the eye of the subject to be photographed and imaged on the film plane of the camera, said signal being of a value which is a minimum value at which the red-eye phenomenon will not occur;
means for calculating a critical distance value $l_0'$ between the subject being photographed and the camera based on the aforesaid values f, $\phi_F'$ and $\phi_0$;
means for comparing the critical value $l_0'$ with the actual distance value l between said subject and said camera; and
means for generating a red-eye alarm signal when $l < l_0'$.

24. A method for detecting the potential occurrence of red-eye phenomenon preparatory to photographing a subject by means of a camera having a taking lens and being used in combination with an electronic flash, said method comprising the steps of;
determining the distance d between said electronic flash and said taking lens;
determining the distance l between said camera and the subject to be photographed; and
determining a critical subject distance value $l_0$ from the formula $d/\tan|\alpha|$, wherein $\alpha_0$ represents the critical angle which is computed from a pupil diameter determined by the brightness of an external field; and
providing a red-eye alarm when $l > l_0$.

25. The method of claim 24 further comprising the step of changing the distance d between said electronic flash and said taking lens to a distance whose value sufficient to prevent occurrence of the red-eye phenomenon responsive to said red-eye alarm.

26. The method of claim 24 further comprising the step of;
changing the focal length of the taking lens responsive to the presence of said red-eye phenomenon alarm to thereby prevent the occurrence of the red-eye phenomenon.

27. A method for detecting the potential occurrence of red-eye phenomenon preparatory to photographing a subject by means of a camera having a taking lens and being used in combination with an electronic flash, wherein said method comprises the steps of;
  determining the focal length f of the taking lens;
  determining the value $\phi_0$ of the pupil diameter determined by the brightness of an external field;
  providing a value $\phi_F'$ representative of the minimum value of light image which can not be observed as a red-eye phenomenon when it is formed in the film plane and printed on a photographic print paper;
  determining a critical value $l_0'$ at which the red-eye condition will not occur in accordance with the formula $l_0' = (\phi_0 \times f)/\phi_F'$; and providing a red-eye phenomenon alarm when the actual distance l between the subject to be photographed and the taking lens is less than the critical value $l_0'$.

28. The method of claim 27 further comprising the step of:
  changing the focal length of the taking lens responsive to said red-eye phenomenon alarm by an amount sufficient to prevent the occurrence of the red-eye phenomenon.

29. A method for detecting the potential occurrence of red-eye phenomenon preparatory to photographing a subject by means of a camera having a taking lens and being used in combination with an electronic flash, said method comprising the steps of:
  determining the distance d between said electronic flash and said taking lens;
  determining the distance l between said camera and the subject to be photographed;
  determining a critical subject distance value $l_0$ from the formula $d/\tan|\alpha_0|$, wherein $\alpha_0$ represents the angle computed from a pupil diameter determined by the brightness of an external field;
  providing a red-eye alarm when the value l is greater than the value $l_0$;
  determining the focal length f of the taking lens;
  determining the value $\alpha_0$ of the pupil diameter determined by the brightness of an external field;
  providing a value $\phi_F'$ representative of the minimum value of light imaged which can not be observed as a red-eye phenomenon when it is printed on a photographic print pater;
  determining a critical value $l_0'$ at which the red-eye condition will not occur in accordance with the formula $l_0' = (\phi_0 \times f)/\phi_F'$; and
  providing a red-eye phenomenon alarm when the actual distance l between the subject to be photographed and the taking lens is less than the critical value $l_0'$, i.e. when $l < l_0'$.

30. The method of claim 24 further comprising the step of;
  determining the brightness of the scene to be photographed; and
  preventing the generation of a red-eye phenomenon alarm when the brightness is greater than a predetermined value.

31. The method of claim 27 further comprising the step of:
  determining the brightness of the scene to be photographed; and
  preventing the generation of a red-eye phenomenon alarm condition when the brightness is greater than a predetermined value.

32. Apparatus for preventing the occurrence of red-eye phenomenon when photographing a subject comprising:
  a camera having a taking lens and a movable electronic flash;
  means responsive to the distance of the subject to be photographed from said camera for generating a red-eye alarm condition signal when said distance falls within a predetermined range; and
  means responsive to said red-eye alarm condition signal for changing the separation distance between said electronic flash and said taking lens to prevent the occurrence of the red-eye phenomenon.

33. Apparatus for preventing the occurrence of red-eye phenomenon when photographing a subject comprising:
  a camera having a taking lens and a movable electronic flash;
  means responsive to the distance of the subject to be photographed from said camera for generating a red-eye alarm condition signal when said distance falls within a predetermined range; and
  means responsive to said red-eye alarm condition signal for changing the separation distance between said electronic flash and said taking lens to prevent the occurrence of the red-eye phenomenon.

34. The combination of claim 18 wherein said means for providing an $\alpha_0$ signal further comprises means for determining the value of the $\alpha_0$ signal based upon a value $\alpha_0$ representing the size of the pupil of the subject to be photographed.

35. The combination of claim 34 further comprising:
  means for determining the brightness of the scene to be photographed; and
  means for determining the value $\phi_0$ based on the brightness value of the scene to be photographed.

36. The combination of claim 35 wherein said means for determining the value $\phi_0$ further comprises table look-up memory means.

37. For use with a camera having a taking lens with an adjustable focal length and an electronic flash spaced a distance d from said taking lens, apparatus for detecting a potential red-eye phenomenon comprising:
  means for determining a value $\phi_F$, representing the size of an eye of a subject to be photographed which will not cause red-eye phenomenon when printed upon photographic print of a predetermined size;
  means for determining the image size $\phi_F$ of a pupil of a subject to be photographed based upon the distance l of the subject to be photographed from the camera, the focal length f of the taking lens and a value $\phi_0$ representing the pupil size of the subject to be photographed; and
  means for generating a red-eye alarm when $\phi_F > \phi_F'$.

38. The apparatus of claim 37 wherein $\phi_F' = 0.1$ mm.

39. The apparatus of claim 37 further comprising:
  means for determining the brightness Bv of the scene to be photographed; and
  means for determining $\phi_0$ based upon the brightness Bv.

40. The apparatus of claim 39 wherein said means for determining $\phi_0$ comprises table look-up memory means.

41. The apparatus of claim 37 wherein said means for determining $\phi_F$ comprises means for determining the value $\phi_F$ according to the formula $\phi_F=(\phi_0\times f)/l$ 42. The method of claim 24 further comprising the step of:

determining the brightness of the scene to be photographed; and generating a red-eye phenomenon alarm when the brightness is less than a predetermined value and when l is greater than 0.

43. The method of claim 27 further comprising the step of:

determining the brightness of the scene to be photographed; and generating a red-eye phenomenon alarm condition when the brightness is less than a predetermined value and when l is less than $l_0'$.

* * * * *

UNITED STATES PATENT AND TRADEMARK OFFICE
CERTIFICATE OF CORRECTION

PATENT NO. : 4,978,989            Page 1 of 2

DATED : December 18, 1990

INVENTOR(S) : Nakano et al.

It is certified that error appears in the above-identified patent and that said Letters Patent is hereby corrected as shown below:

Column 1, line 45, "No. 58-2002" should be --No. 58-20021--

Column 4, line 62, "$\ell_0 = d/\tan|\alpha_0|$ (3) to --$\ell_0 = d/\tan|\alpha_0|$      (3)--

Column 5, line 18, "assuring" should be --assuming--

Column 5, line 25, change "$\binom{}{h}$" to --$\binom{\otimes}{h}$--

Column 5, lines 31-33, change "$\binom{\tan\alpha}{}$" to --$\binom{\tan\alpha}{\otimes}$--

Column 5, lines 31-33, before "$\binom{1\ 4}{0\ 1}$" insert -- = --

Column 5, line 35, after "D" and before ":", insert --$\otimes$--

Column 5, line 57, before the ":", insert --$\otimes$--

Column 7, line 3, after "a" insert --popular size and average pupil diameter is assumed. It --

Column 7, line 52, change "tanp" to --tan--

Column 8, line 26, "!6" should be --16--

Column 8, line 49, "i4" should be --14--

UNITED STATES PATENT AND TRADEMARK OFFICE
CERTIFICATE OF CORRECTION

PATENT NO. : 4,978,989
DATED : December 18, 1990
INVENTOR(S) : Nakano et al.

It is certified that error appears in the above-identified patent and that said Letters Patent is hereby corrected as shown below:

Column 12, line 32, after "distance" insert -- $\ell$ --

Column 12, line 40, before "being" insert --said critical angle--

Column 12, line 68, "and and" should be --and an--

Column 13, line 57, after "formula:" insert -- $\ell_0' = (\phi_0 \times f)/\phi F'$ --

Column 16, line 35, "$\alpha_0$" should be -- $\phi_0$ --

Column 16, line 49, "$\phi F$" should be -- $\phi F'$ --

Column 18, line 3, "0" should be -- $\ell_0$ --

Signed and Sealed this

Nineteenth Day of May, 1992

*Attest:*

DOUGLAS B. COMER

*Attesting Officer*      *Acting Commissioner of Patents and Trademarks*